(12) United States Patent
Bolin (10) Patent No.: US 9,575,992 B2
(45) Date of Patent: Feb. 21, 2017

(54) PRESENTATION OF A DIGITAL MAP (75) Inventor: Johan Bolin, Spånga (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 828 days.

(21) Appl. No.: 13/322,098

(22) PCT Filed: Jul. 17, 2009

(86) PCT No.: PCT/SE2009/050908
§ 371 (c)(1),
(2), (4) Date: Nov. 22, 2011

(87) PCT Pub. No.: WO2011/008147
PCT Pub. Date: Jan. 20, 2011

(65) Prior Publication Data
US 2012/0078502 A1    Mar. 29, 2012

(51) Int. Cl.
*G06F 17/30* (2006.01)
*G01C 21/36* (2006.01)
*G01C 21/26* (2006.01)
*G09B 29/10* (2006.01)

(52) U.S. Cl.
CPC ....... *G06F 17/30241* (2013.01); *G01C 21/367* (2013.01)

(58) Field of Classification Search
CPC .................. G01C 21/367; G06F 17/30241
USPC .......... 701/58, 117–122, 300–302, 400–541; 340/988–995.25; 715/855
See application file for complete search history.

(56) References Cited

U.S. PATENT DOCUMENTS

| | | |
|---|---|---|
| 7,268,703 B1 | 9/2007 | Kabel et al. |
| 2005/0024238 A1 | 2/2005 | Kimura |
| 2007/0106455 A1 | 5/2007 | Fuchs |
| 2009/0150069 A1 | 6/2009 | Iao |

FOREIGN PATENT DOCUMENTS

| | | |
|---|---|---|
| CN | 1731093 A | 2/2006 |
| EP | 0897169 A2 | 2/1999 |
| EP | 1508777 A1 | 2/2005 |
| EP | 1783457 A1 | 5/2007 |
| JP | H09152349 A | 6/1997 |
| JP | 11037770 A | 2/1999 |
| JP | 2005030800 A | 2/2005 |
| JP | 2005127994 A | 5/2005 |
| JP | 2005147792 A | 6/2005 |
| JP | 2006170950 A | 6/2006 |

(Continued)

*Primary Examiner* — Khoi Tran
*Assistant Examiner* — Dale Moyer
(74) *Attorney, Agent, or Firm* — Coats & Bennett, PLLC (57) ABSTRACT

The invention relates to a method, a map providing device, a computer program and a computer program product for presenting a digital map via a map presenting unit of a user terminal. An object (O1) and a first position (P1) of this object are obtained together with a digital map (M1) comprising a reference position (RP) and the first position (P1). A line (L1) is determined, which at one end is to be connected to the reference position and at another opposite end to the first position. Then a geographical area (A1) of the digital map including the reference position is presented. If the first position (P1) is outside of the geographical area then a part (L1A) of the line stretching through the geographical area is presented. If not no line is presented. The appearance of the line when presented is dependent on the distance between the reference position and the first position.

32 Claims, 5 Drawing Sheets

(56) References Cited

FOREIGN PATENT DOCUMENTS

| | | | |
|---|---|---|---|
| JP | 2006330745 | A | 12/2006 |
| JP | 2007279637 | A | 10/2007 |
| JP | 2008065092 | A | 3/2008 |
| JP | 2010026409 | A | 2/2010 |
| WO | 2007008055 | A1 | 1/2007 |
| WO | 2008010699 | A1 | 1/2008 |

PRESENTATION OF A DIGITAL MAP

TECHNICAL FIELD

The invention relates to presenting of digital maps via user terminals. More particularly, the invention relates to a method, a map providing device, a computer program and a computer program product for presenting a digital map via a map presenting unit of a user terminal.

BACKGROUND

Digital maps are getting increasingly popular to use in various applications for a user as the natural way to present the relationships between people, vehicles, animals, places, business or other points of interest in a geographical context.

Presentation of images with a position is used in many applications like Flickr and Panoramio.

When rendering or presenting multiple objects on a map, in particular when rendered together with a reference position, like the position of the user itself, is that if the zoom level in the map is set for rendering all the objects in the map, then the information level (e.g. geographical) becomes very low, which makes it hard to navigate in and relate to the map for the user.

There are various ways to mitigate this problem. One way is to display a miniature map with low zoom level together with a map with a high zoom level. Another way is to render an arrow on the map pointing in the direction where the reference position may be found. Yet another way is to render a list with the different objects and the map is re-rendered to cover various objects through selection of an object in the list that the map is to cover.

All these different ways have problems in relation to user friendliness, especially if the screen is relatively small. The typical problem is that the user "gets lost" in the map, which results in user frustration and dissatisfaction with the service providing the map.

Moreover, the existing solutions typically offer solutions that are directed towards a user relocating his or her position or finding out his or her position by adjusting zoom level and manually pan the map. Alternatively one or more objects may be highlighted.

There is therefore a need for improvement in this field of technology.

SUMMARY

The invention is therefore directed towards improving the user friendliness in relation to presenting of digital maps.

One object of the invention is thus to provide a more user-friendly presenting of a map via a map presenting unit of a user terminal.

This object is according to a first aspect of the invention achieved through a method for presenting a digital map via a map presenting unit of a user terminal. In the method a first object and a first position of this first object are obtained. Also a digital map is obtained, which comprises a reference position and the first position. A first line is further determined. This first line is at one end to be connected to the reference position and at another opposite end to the first position. Finally a geographical area of the digital map including the reference position is presented. In case the first position is outside of the geographical area a part of the first line that stretches through the geographical area is presented and otherwise, i.e. in the case that the first position is inside the geographical area, no first line is presented. The appearance of the first line when presented is dependent on the distance between the reference position and the first position.

The appearance of the first line may be dependent on the distance between the reference position and the first position through using different colours and/or intensities as well as types of lines. The appearance may also be dependent on the distance between the reference position and the first position through various influences on the shape of the line, such as various thicknesses, various distances between dots of the line if the line is dotted, spatial meander frequency if the line is meandering or through the curvature of the line in case it is curved.

The object is according to a second aspect of the invention achieved through a map providing device for presenting a digital map via a map presenting unit of a user terminal. This map providing device comprises a map presenting control unit that is configured to obtain a first object and a first position of this first object as well as the digital map, which digital map comprises a reference position and the first position. The map presenting control unit is further configured to determine a first line, which at one end is to be connected to the reference position and at another opposite end to said first position and present a geographical area of the digital map including the reference position. If the first position is outside of the geographical area the map presenting control unit is configured to present a part of the first line that stretches through the geographical area. Otherwise, i.e. in the case that the first position is inside the geographical area, no first line is presented by the map presenting control unit. The appearance of the first line when presented is dependent on the distance between the reference position and the first position.

The map providing device may be a map server with which the user terminal communicates via a network communication interface. Alternatively the map providing device may be the user terminal and then it would also comprise a user input unit. A user terminal can here be a cellular phone or a navigation device. The map providing device may also comprise a network communication interface for communicating with other devices.

This object is according to a third aspect of the invention also achieved by a computer program comprising computer program code which when run on a map providing device for presenting a digital map via a map presenting unit of a user terminal, causes the map providing device to obtain a first object and a first position of this first object as well as the digital map comprising a reference position and the first position. The computer program code furthermore causes the map providing device to determine a first line, which at one end is to be connected to the reference position and at another opposite end to said first position, and present a geographical area of the digital map including the reference position. If the first position is outside of the geographical area then a part of the first line that stretches through the geographical area is presented and otherwise, i.e. if the first position is inside of the geographical area, no first line is presented. The appearance of the first line when presented is dependent on the distance between the reference position and the first position.

The above-mentioned object is according to a fourth aspect of the invention achieved through a computer program product comprising a computer program according to the third aspect and a computer readable means on which the computer program is stored.

The invention has many advantages. Through the use of the first line it is possible for a user to get an indication of the distance to the first object without actually seeing this object. In this way the user will get a good perception of points-of-interest that are not rendered via the map presenting unit. Through the provision of the first line it is also possible to discern in which direction the first object is located. This can thus be done together with presenting a geographical area at a map resolution that is adapted for providing intelligible map information to the user, i.e. which allows the user to discern other objects on the map. In this way the user will both get distance information as well as map information that he or she can understand.

The dependency on the distance between the reference position and the first position of the appearance of the first line can be performed through coding of distance data into the shape of the first line.

According to one variation of the invention the first line has a first line component in the direction from the reference position towards the first position and a second line component perpendicular to this direction. Distance data reflecting the distance is here coded into the second line component. In this way it is possible to indicate the direction through the first line component and the distance through the second line component, which is an efficient and economical way if indicating both distance and direction.

The first line may here be curved and the distance coded into the second line component through the largest height between the curved first line and a straight reference line between the reference and first positions being provided halfway between the reference position and the first position. The largest height may furthermore be pre-determined and independent of the distance between the reference position and the first position in relation to the scale of the digital map. This provides an easily understandable way of coding distance data into a line. The distance can then be estimated by a user through inspecting the angle between the curve and the reference line at the reference position.

An alternative way to code the second line component is through the first line being meandering with a spatial meander frequency indicative of the distance.

The spatial meander frequency may here be inversely proportional to the distance.

Yet another alternative coding into the second line component is varying the thickness of the first line.

The distance may here be inversely proportional to the thickness of the first line.

The coding into the shape of the line may also be a line type of coding, for instance selecting different types of lines, like dashed, dotted, dash-dotted lines as well as through varying the distances between dashes and/or dots in such lines.

It is also possible that the appearance of the first line is dependent on the distance between the reference position and the first position through using colour or intensity coding of the line. This may be done through displaying the line with a colour and/or with an intensity that represents the distance.

According to another variation of the invention the method further comprises the steps of providing a user input area in the presented geographical area stretching between the reference position and the first position and encircling the first line, detecting user inputs in the user input area and performing a map selecting function based on the detected user inputs.

According to this variation the map presenting control unit of the map providing device is further configured to provide a user input area in the presented geographical area stretching between the reference position and the first position and encircling the first line and to perform a map selecting function based on user inputs that are detected in said user input area.

According to this variation of the invention the computer program code furthermore causes the map providing device to provide a user input area in the presented geographical area stretching between the reference position and the first position and encircling the first line and to perform a map selecting function based on user inputs that are detected in said user input area.

This allows simple and user friendly selection of map selection functions in relation to be made in relation to the reference position and the first position.

A map selecting function may be a change in geographical area being presented, where such a change may be a zooming out for presenting both the reference position and the first position. It may also be a panning of the digital map for presenting a geographical area covering the first position and presenting the first object in this geographical area. It can also be the presenting of further data in relation to the first objector or the initiating of communication with a device associated with the first object.

According to another variation of the invention there is a second object relating and subordinate to the first object.

A subordinate object may be an object associated with an entity that is subordinate to an entity associated with the first object. The first object may here represent a person. In this case a subordinate object may represent another person who is under the supervision, command or control of the person associated with the first object.

In relation to this second object the method may further comprise the steps of providing a second line, which at one end is connected to the first position and at another opposite end to a second position that is the position of said second object and presenting a part of the second line that stretches through the presented geographical area in case the second position is outside the presented geographical area while the map zoom level is below a zoom threshold and otherwise refraining from presenting the second line.

In relation to this second object the map presenting control unit of the map providing device may be further configured to provide a second line, which at one end is connected to the first position and at another opposite end to a second position that is the position of said second object and present a part of the second line that stretches through the presented geographical area in case the second position is outside the presented geographical area while the map zoom level is below a zoom threshold and otherwise refrain from presenting the second line.

In relation to this further object the computer program code may furthermore causes the map providing device to provide a second line, which at one end is connected to the first position and at another opposite end to a second position that is the position of said second object and present a part of the second line that stretches through the presented geographical area in case the second position is outside the presented geographical area while the map zoom level is below a zoom threshold and otherwise refrain from presenting the second line According to a further variation of the invention there may be several further objects relating and subordinate to the first object and the first position of the first object is a centre point between the positions of these further objects.

In relation to such further objects the method may furthermore comprise the steps of detecting an instruction to zoom-in in the presented geographical area and perform zooming in in the geographical are, where further objects are presented only after performing this zooming-in.

In relation to such further objects the map presenting control unit of the map providing device may be further configured to detect an instruction to zoom-in in the presented geographical area and perform zooming-in in the geographical area, where further objects are presented only after this zooming-in has been performed.

In relation to such further objects the computer program code may furthermore cause the map providing device to detect an instruction to zoom-in in the presented geographical area and perform zooming in in the geographical are, where further objects are presented only after this zooming-in has been performed.

One type of user input may be a directional user input of movement across the first line and the user input area. Another type of user input may be a directional user input of movement in the user input area along the first line. A further type of user input may be a clicking on the first line.

According to one variation of the invention the reference position is the position of the map presenting unit. The reference position may furthermore be moving along a movement path.

In relation to this type of movement along a movement path the method may comprise the step of removing the first line or refraining from presenting the first line in case a branching point along the movement path that leads to the first object has been passed by the reference position. Data relating to the first object may also be presented together with the first line.

In relation to this type of movement along a movement path the map presenting control unit of the map providing device may be further configured to remove the first line or refrain from presenting the first line in case a branching point along the movement path that leads to the first object has been passed by the reference position. Data relating to the first object may also be presented together with the first line.

In relation to this type of movement along a movement path the computer program code may furthermore cause the map providing device to remove the first line or refrain from presenting the first line in case a branching point along the movement path that leads to the first object has been passed by the reference position. Data relating to the first object may also be presented together with the first line.

According to a further variation of the invention the first position is a position associated with a further terminal.

In relation to this further terminal the method may comprise the further step of obtaining the position of this further terminal using a position locating function.

In relation to this further terminal the map providing device may comprise an object position location unit configured to obtaining the position of this further terminal.

In relation to this further terminal the computer program code may furthermore cause the map providing device to obtain the position of this further terminal using a position locating function.

It should be emphasized that the term "comprises/comprising" when used in this specification is taken to specify the presence of stated features, integers, steps or components, but does not preclude the presence or addition of one or more other features, integers, steps, components or groups thereof.

BRIEF DESCRIPTION OF THE DRAWINGS

The invention will now be described in more detail in relation to the enclosed drawings, in which.

DETAILED DESCRIPTION

In the following description, for purposes of explanation and not limitation, specific details are set forth such as particular architectures, interfaces, techniques, etc. in order to provide a thorough understanding of the invention. However, it will be apparent to those skilled in the art that the invention may be practiced in other embodiments that depart from these specific details. In other instances, detailed descriptions of well-known devices, circuits, and methods are omitted so as not to obscure the description of the invention with unnecessary detail.

The invention is generally directed towards presenting objects on digital maps via user terminals. An object may here be an object in a map such as a building, a place of business. The object may here be related to a location on the map that can be of interest to the user, such as relate to points-of-interest to the user. Such points-of-interest may provide various services like hair-dressers or stores, as well be sites, like historically interesting sites. However, an object may also be an imported object presented on the map, such as an object representing a person equipped with a portable user terminal, a vehicle etc. This means that an object may be a fixed object or a mobile object. An object may therefore also be a graphical symbol like an icon presented on or in relation to the digital map. An object may thus be a symbol, which in some way provides an appropriate indication that enables a user to identify a person, establishment or any other item that may be of interest to him or her and being linked to an associated position on the digital map.

The invention is more particularly directed towards presenting the distance between such an object and a reference position, when a geographical area including the reference position is presented, while the object is not, i.e. the object is outside of the geographical area. This is done in order to simplify for a user to determine how far away an object is located. This is especially important for map presenting units, such as displays, which are small in size and where a small geographical area consequently often needs to be presented in order for the user to be able to discern details in the map.

Figure 1:
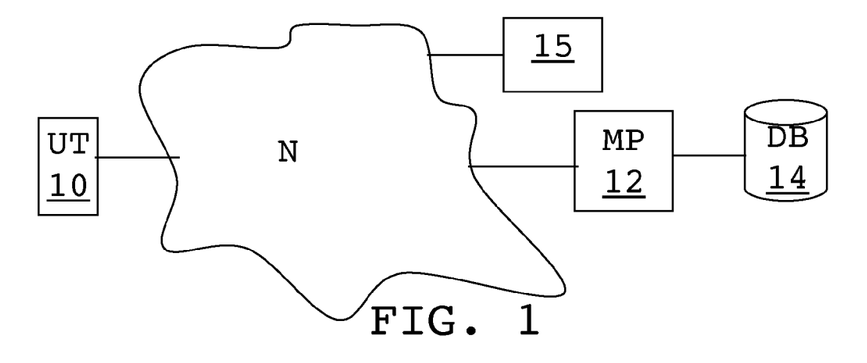
FIG. 1 schematically shows two user terminals and a map server being connected to a communication network, where the map server is also being directly connected to a map database.

The invention will now be described in more detail in the non-limiting example context of a communication network N that may be a WAN (Wide Area Network). The network N is shown in FIG. 1. This network N may here be a cellular network such as a UMTS (Universal Mobile Telecommunications System) network or an LTE (Long Term Evolution) network with or without connection to an IMS (Internet Protocol Multimedia Subsystem). However it may also be a landline network. The invention is actually not limited to wide area networks, but may in fact be realized without the use of such networks. To the network N there is connected a first user terminal 10, which in the present example is a cellular phone. A cellular phone is merely one example of a user terminal with which the invention may be used. Other types of user terminals are computers, like a PC (Personal Computer) and laptop and/or palmtop computers, and electric organizers. In one variation of the invention the first user terminal is implemented in a stand-alone guidance device or navigation device, such as a GPS (Global Positioning System) based guidance device which only is able to receive input from a user, GPS satellites, and/or signals from a vehicle that utilizes a dead-reckoning system to estimate e.g. the position of the navigation device. The user terminal 10 communicates with a map server 12, which in turn is connected to a map database 14. Although the map database 14 here in FIG. 1 is depicted as being outside the map server 12, the map server 12 may in other embodiments comprise also the map database 14. To the network N there is furthermore connected a further user terminal 15.

The map server 12 is here a map providing device according to one embodiment of the invention, while the user terminal 10 is a map providing device according to another embodiment of the invention.

Figure 2:
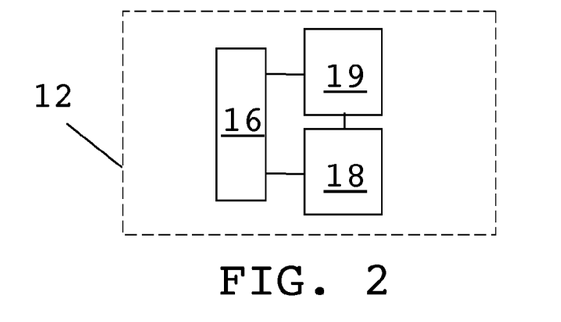
FIG. 2 shows a simplified block schematic of a map server.

FIG. 2 schematically shows the content of the map server 12. The map server 12 includes a communication interface 16 to the network for communicating with other devices via the network as well as with the database 14. It also includes a server map providing unit 18, which in the example to be given later processes instructions received from the user terminal 10, fetches digital maps from the map database 14 and returns the results to the user terminal 10. There is here also a server object position locating unit 19 connected to the server map providing unit 18 as well as to the interface 16. This server object position locating unit 19 locates the positions of objects, for instance using the communication network N. It may be a 3GPP (3$^{rd}$ Generation Partnership Project) LCS (Location Services) function or an OMA (Open Mobile Alliance) loc function or a Geopriv function. What it does is to locate the positions of a physical object, like a cellular phone. It may here also provide a graphical object related to the person.

Figure 3:
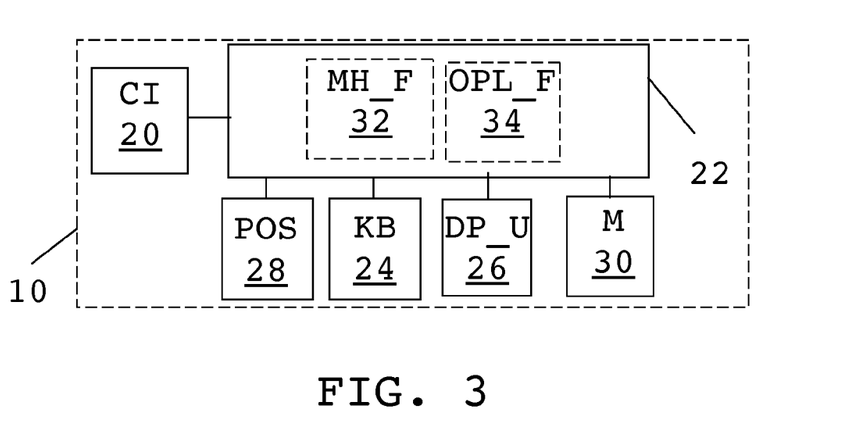
FIG. 3 shows a simplified block schematic of a user terminal.

FIG. 3 schematically shows a block schematic of the first user terminal 10 according to one variation of the invention. The first user terminal 10 includes a communication interface CI 20 for communicating with the network N. The communication interface 20 is connected to a terminal control unit 22, which includes a user terminal map handling unit 32 implementing a terminal map handling function MH_F and a terminal object position locating unit 34 implementing an object position locating function OPL_F. The terminal control unit 22 is in turn connected to a user input unit 24, here in the form of a keyboard KB and to a map presenting unit 26 here in the form of a display unit DP_U 26. The object position locating unit 34 may provide an object position locating function OPL_F according to any of the previously described types. To the terminal control unit 22 there is also connected a positioning unit POS 28 and a memory M 30. The positioning unit 28 is a unit providing a user terminal position, i.e. it obtains the position of the first user terminal itself and can therefore be a GPS positioning unit in the form of a GPS signal receiving and calculation circuit. It should here be mentioned that as an alternative it is possible that the user terminals position may be obtained via the object position locating unit 34. The positioning unit 28 may also be implemented with the help of software run on a processor of the first user terminal 10. Software embodiments of the positioning unit 28 may utilize the knowledge of the position of a current network cell-identity in order to determine the position of the first user terminal 10. Alternatively or in addition thereto, the position of first the user terminal 10 may be determined based on triangulation of radio base station signals. The two latter positioning techniques are beneficial in locations where sufficient positioning signals from GPS satellites can not be received.

A keyboard is one type of user input unit that may be used. However, it is also possible with other types of user input units such as mouse or a track ball. It is also possible to have a combined user input unit and map presenting unit. This is the case if a touch screen is used. Then the touch registration layers provided above a display layer are used as a user input unit, while the display layer is used as a map presenting unit.

In the first embodiment of the invention it is possible that the user terminal 10 is not provided with an object position locating function 34. It is also here possible to remove the memory 30 and the positioning unit 28, even though they may also be used. The functioning of the terminal map providing unit 32 in the first embodiment is furthermore limited to acting as a client to the server map providing unit 18.

Figure 4:
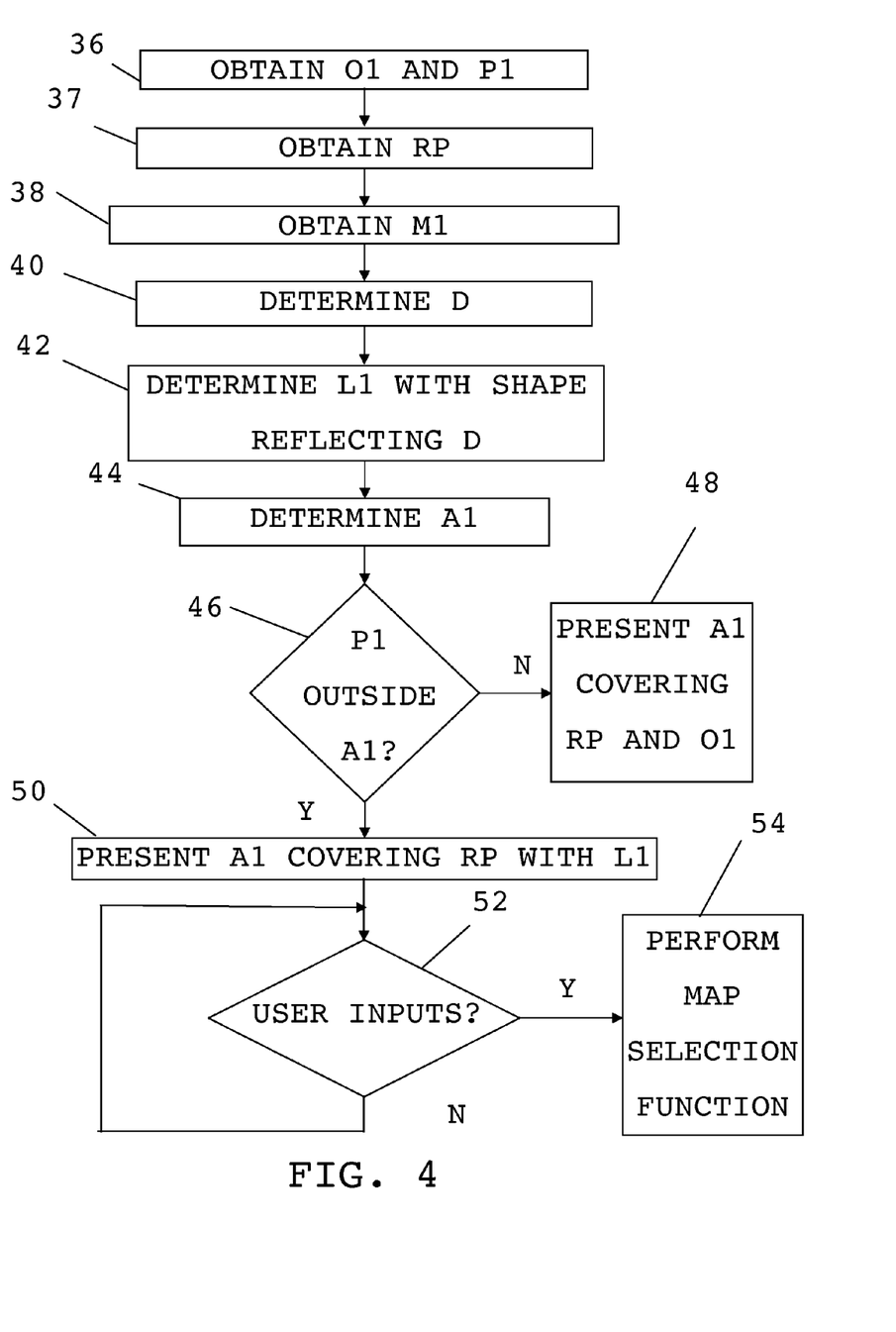
FIG. 4 shows a flow chart of a number of method steps being performed in a method for presenting a digital map via a map presenting unit of a user terminal according to a first embodiment of the invention, FIG. 5 schematically shows a digital map having two separate geographical areas, with a reference object in a first geographical area being linked to a first object in the second geographical area via a first line, FIG. 6A schematically shows the first geographical area in FIG. 5 comprising a reference object and a first part of the first line, FIG. 6B schematically shows the geographical area comprising the first object and a second part of the first line, FIG. 7 schematically shows a part of the second geographical area comprising the first object, a third part of the first line as well as further objects related to the first object.

Now the functioning of the invention according to the first embodiment of the invention will be described in more detail with reference being made to the previously described FIG. 1-3 as well as to FIG. 4, which shows a flow chart of a number of method steps being performed in a method for presenting a digital map via a map presenting unit of a user terminal, to FIG. 5, which shows a digital map having two separate geographical areas, with a reference object in one geographical area being linked to a first object in the second geographical area via a first line, to FIG. 6A which shows the first geographical area in FIG. 5 comprising the reference object and a first part of the first line and to FIG. 6B which shows the second geographical area comprising the first object and a second part of the first line.

With digital maps it is today possible to provide a user with a great deal of information regarding various positions on the digital map. This opens up great opportunities for a user to find interesting information and useful data regarding map positions as well as to locate data providing such information or other functionality that is of interest to him or her. Objects in and on the map are often of interest in relation to a reference position. This position may be the position of the user terminal itself, which then should reflect the position of the user. However, a reference position may also be another position, for instance a position of a location the user is to visit, has recently visited or is interested in for other reasons. Objects that are of interest may be mobile objects representing family, friends, and competitors in a game, but can also be other mobile objects such as vehicles like cars and buses. Objects may also be objects in a map such as a particular building, an establishment, such as a store or a restaurant, a park or any other type of entity presented in a map. It is here possible to present the map at a zoom level where both object and reference position can be presented simultaneously. However, there are two disadvantages with this in relation to presenting the distance between the two positions to the user. If the map presenting unit is small in size, which is normally the case for cellular phones but also for many navigation devices, then it may be hard to establish the distance because map elements, like buildings and streets, are so small that they cannot provide any meaningful information. This is furthermore made even more problematic if the user is interested in several objects simultaneously.

If the scale is changed through zooming in to the reference position then it is easier to digest the geographical information of the map. However, then the object may no longer be possible to present. It is here possible that the general direction to the object is indicated, for instance through arrows, but then distance information is lost. This means that the user would have to switch back and forth between different zoom levels in order to get an understanding of the distance between the reference position and the object of interest while retaining an understanding of the local vicinity of the reference position. It may furthermore involve many zooming in and zooming out instructions. This may be very annoying and also time consuming.

The present invention is directed towards easing this burden in relation to presenting of distance information for a user when providing an object and a reference position.

The user terminal 10 is in this first embodiment merely a rendering device. It therefore communicates with the map server 12 in order to obtain a map to be presented on the display unit 26. The terminal map providing unit 32 is here therefore merely a client function that connects to the server map providing unit 18. In this embodiment the server map providing unit 18 is thus a server acting as a map presenting control unit.

The user may here first be prompted to provide a first object and possibly also a first position of this first object. The user may here provide the first object and first position through indicating a position or an object on a digital map, for instance through identifying a building on a map being presented via the display unit 26. For this reason a digital map may have been transferred from the server map presenting control 18 unit to the terminal map providing unit 32, which renders it on the display unit 26 and the user may then select a position on this map using the keyboard 24, which position thus thereby also indicates an object. Objects may as an alternative be obtained through searching in the map, for instance searching in relation to objects of different types, such as restaurants. In this respect the user may here enter a search term in relation to a reference position, transmit this search term to the server map providing unit 18 and receive a map with objects found in a search based on the search term indicated on the received map.

However, the user may also indicate an object through indicating a friend. The user may here use the terminal object position locating unit 34 in the terminal 10 in order to obtain a position of the friend, this position and a graphical object representing the friend may then be transferred to the server map presenting control unit 18. The terminal object position locating unit 34 may here locate the position based on an object position location function as described above. However it is also possible that the server map presenting control unit 18 handles such an object position location. The user may therefore indicate an identifier of a user terminal of a friend, such as a cellular phone number, the friends name or alias in an IMS presence service. In the present example the user may indicate such a terminal identifier via the keyboard 24. The user may here also provide a graphical object that is to represent the friend. This terminal identifier is then forwarded to the server device via the communication interface 20, possibly accompanied by a graphical object.

The map presenting control unit 18 of the server device 12 then receives the terminal identifier via the communication interface 16 and possibly also the graphical object representing the friend in question. If no graphical object is received, the server map providing unit 18 may generate one itself. Alternatively it may receive a graphical object from the server object position locating unit 19 as the position of the friend is located. As an example this position may be the position of the further user terminal 15 in the network N. The server map providing unit 18 may then connect to the server object position locating unit 19 with the user identifier, and this server object position locating unit 19 may thereafter locate the position of the friend. Here the server position locating unit 19 may use any conventional position locating functionality, such as one based on cell identity, triangulation, MPS or GPS position. The server object position locating unit 19 then provides the position and possibly also an object associated with the position to the server map presenting control unit 18. This position is here denoted a first position and the object is denoted a first object. In this way the server map providing unit 18 obtains the first object O1 and the first position P1, step 36.

The server map providing unit 18 also obtains the reference position, step 37, possibly together with a reference object. The reference position may here be obtained through prompting the user to enter a reference position, which may be done through the user indicating a position on a map being rendered via the display unit 26. Alternatively it is possible that the position of the user is obtained by the positioning unit 28 in the user terminal 10, which is transferred to the server map presenting control unit 18. It is also possible that the server map providing unit 18 locates the position of the user terminal 10 using the server object position locating unit 19. It is also possible that a default position on the digital map is provided as reference position. It is here furthermore possible that a reference object RO is provided for the reference position, especially if this position is the position of the user. Alternatively an object in the map, like a building of the position, may be provided as a reference object. It is also possible that no reference object is provided.

The server map providing unit 18 that acts as a map presenting control unit then obtains a digital map M1, step 38. In this embodiment it collects the digital map M1 from the database 14, which digital map M1 covers the first position as well as a reference position. The digital map thus includes the reference position and the first position.

The server map providing unit 18 thereafter determines the distance D between the reference position RP and the first position, step 40. This may be done through comparing the map coordinates of the reference position and the first position.

Thereafter the map presenting control unit determines a first line that is to be stretching between the reference and first positions. The appearance of the line when later being presented will here be dependent on the distance between the reference position and the first position. The map presenting control unit can then be seen as coding distance data reflecting the distance into the appearance of the first line and in this case into the shape of the first line. In some embodiments of the present invention, the first line therefore determines a line L1 having a shape that reflects the distance D between the reference position RP and the first position P1, step 42. The first line is thus at a first end to be connected to the reference position and at another opposite end to the first position.

The first line may here have a first line component in the direction from the reference position towards the first position and a second line component perpendicular to this direction, where distance data reflecting the distance is coded into the second line component. How a first line according to a first embodiment of the invention may be provided is shown in FIG. 5.

Figure 5:
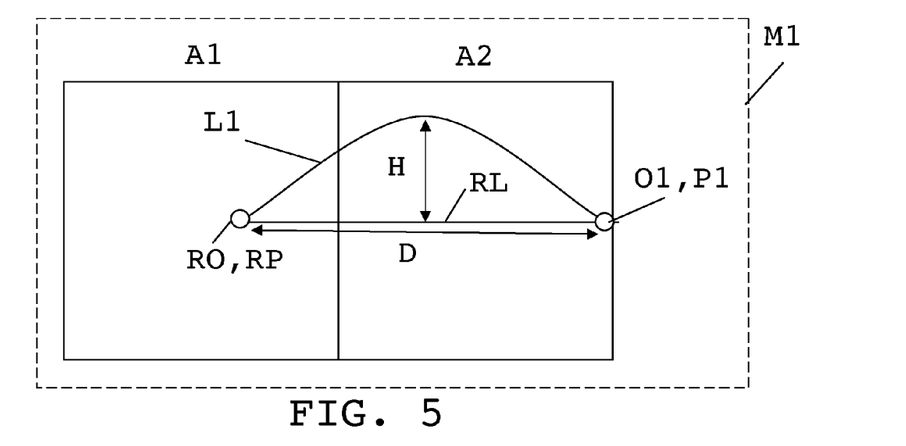

In FIG. 5 there is shown the digital map M1 with a first geographical area A1 covering the reference position RP and a reference object RP, as well as a second geographical area A2 covering the first object O1 and the first position P1. The first line L1 may here be curved, for instance parabolic, and the distance data is coded into the second line component through the largest height H between the curved first line and a straight reference line RL between the reference and first positions RP and P1 being provided halfway between the reference position RP and the first position P1. This largest height may furthermore be pre-determined and independent of the distance between the reference position and the first position in relation to the scale of the digital map and applied for all first lines used for the map. This means that all lines used to indicate the distance in a map will have the same height and same general shape. However, the curve will be compressed or expanded based on the distance.

It should here be realized that what is shown in FIG. 5 is not rendered on the display unit 26 of the user terminal 10. This figure is only shown in order to provide a better understanding of the invention.

As the first line L1 has been determined this way a first geographical area A1 to be presented is determined by the server map presenting control unit 18, step 44. This may be done through the server map presenting control unit receiving user selections made via the keyboard 24 being transferred from the user terminal, for instance through zooming or panning operations selected by the user. Alternatively the server map presenting control unit may determine the geographical area in which the reference position is provided by default based on the map resolution, map size and display unit size.

As the geographical area A1 has been determined, the server map presenting control unit 18 continues and investigates whether the first position P1 is outside of the first geographical area A1 or not, step 46. In case it is not, the server map providing unit 18 transfers the geographical area of the map with the reference object RO and first object O1 to the user terminal 10, where the terminal map providing unit 32 of the terminal control unit 22 goes on and presents the first geographical area via the display unit 26. The first geographical area that is presented in this case thus covers both the reference position and the first object, step 48. This means that the first geographical area of the digital map is presented in normal fashion with the reference object RO at the reference position RP and the first object O1 at the first position O1. However, the first line L1 is not presented. The server map presenting control unit 18 thus refrains from presenting the first line.

If however the first object O1 has a position outside of the presented first geographical area A1, step 46, then the server map providing unit 18 sends over the first geographical area A1 of the digital map M1 that covers the reference object RO at the reference position RP together with a part of the first line L1, step 50, for being presented on the display unit 26. It may here also transfer the reference object.

The terminal map providing unit 32 of the user terminal 10 then proceeds and renders or presents the first geographical area A1 via the display unit 26.

It should here be realized that as an alternative the determination of the first line can be made later than what was described above. It may for instance be determined only after the first position has been found to lie outside of the first geographical area.

Figure 6A:
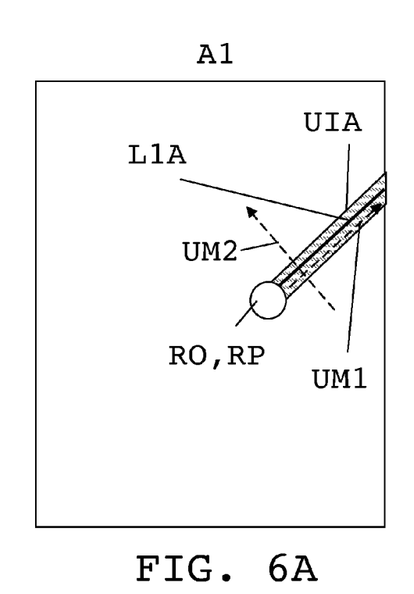

The first geographical area being presented is schematically shown in FIG. 6A. As can be seen the first line L1 is not presented in its entirety. Rather only a first part L1A of the first line that stretches through the geographical area A1 is being presented. The rest is not presented.

Through this presenting it is possible for the user to get an indication of the distance to the first object without actually seeing this object. In this way the user will get a good perception of points-of-interest that are not rendered via the display unit. Through the provision of the first line it is also possible to discern in which direction the first object is located. This can thus be done together with presenting a geographical area at a map resolution that is adapted for providing intelligible map information to the user, i.e. which allows the user to discern other objects on the map. In this way the user will both get distance information as well as map information that he or she can understand. This advantage is even more evident if distances to several objects are provided in the above described way. Through using a line where distance is coded into a second line component it is possible to indicate the direction through the first line component, which is an efficient and economical way if indicating both distance and direction.

In this variation of the first line L1, it is clear that the angle between the first line and the straight reference line (which is not shown) at the reference position in the first geographical area provides a good indication of the distance. This angle will be relatively high if the first object is close to the reference position and relatively small if the distance is large. The height of the curve in the first geographical area thus provides a good indicator on the distance.

In order to provide the user with a simple way to navigate through the map, the map presenting control unit may provide a user input area UIA in the presented geographical area stretching between the reference position RP and the first position and encircling the first line. This means that this user input area is provided as a band covering the line from the reference position RP to the edge of the display unit 26, where the line leaves the geographical area being presented. User inputs being made by the user in this user input area UIA are then detected, step 52, and a map selection function is performed based on a corresponding user input area input, step 54.

User inputs may with advantage be detected through for instance cursor movements on the display, which may be performed through touching in case the display is a touch screen. It is also possible using arrows on the keyboard or a mouse. Such detected user inputs are then transferred from the terminal map providing unit 32 to the server map presenting control unit 18, which performs a corresponding map selection function. The user inputs in relation to the user input area may be associated with a number of map selecting functions, of which a few will be described below.

At least some of the map selecting functions provided involve a change in the geographical area being presented.

In FIG. 6A a first type of user input is indicated in the form of a directional user input that is a movement UM1 in the user input area UTA along the first line. When such a user input is detected and transferred to the server map presenting control unit 18, this unit may select a second geographical area A2 to be presented. Here this selection involves selecting the second geographical areas A2 in which the first position P1 is provided. This thus means that the server map providing unit 18 forwards the second geographical area A2 of the digital map together with the first object O1 to the terminal map providing unit 32, which goes on and presents the first object O1 on the second geographical area A2 of the digital map. Typically this geographical area A2 is presented with the same map resolution as the first geographical area.

Figure 6B:
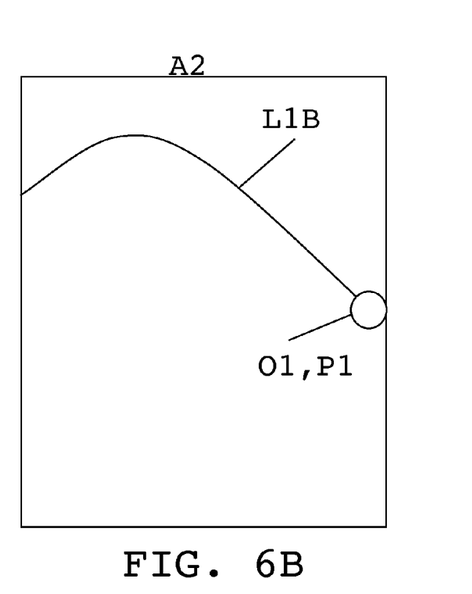

This is schematically shown in FIG. 6B. Here there is also shown a second part L1B of the first line, which is the part of the first line that is provided in the second geographical area A2. In this way it is possible to make a fast and direct pan operation for reaching the first object O1. This can thus be done in one step, which is advantageous if there are many map views at the specific map resolution between the first and the second geographical areas. It should here be noted that it may be possible to pan back to the first geographical area through a corresponding user moment in the user input area (not shown) that encircles the first line in the second geographical area between the first position P1 and the edge of the display unit 28, such a movement is with advantage a movement in the direction towards the reference position. This map selecting function is thus a panning of the digital map for presenting a geographical area covering the first position P1 and presenting the first object O1 in this geographical area A2.

It is possible with further types of user inputs. If the user, with reference now again being made to FIG. 6A, would make a directional movement UA2 across the first line and the user input area UTA in the first geographical area A1, then another map selection function is provided. In this case it is possible that the server map presenting control unit zooms out and sends a geographical area of the digital map which covers both the reference and the first position. In this way both reference position and the first position are presented. This map selecting function is thus a zooming out for presenting both the reference position and the first position.

Another user input could be a clicking on the first line in the user input area in the geographical area being presented, which may be either the first geographical area or the second geographical area. This could lead to the selection of a map selecting function where further data in relation to the first object is fetched. This may for instance be through connecting to a link provided by the first line, such as a uniform resource locator (URL). This link could lead to a server, where further data could be fetched. If for instance the first object is a restaurant, data relating to a menu provided by the restaurant could then be fetched. It could also be rating data, opening hours, type of restaurant etc.

As another alternative the map selecting function could lead to the initiation of communication with a device associated with the first object. If the first object is a restaurant it is then possible that a call is set up to the restaurant or that an electronic message is sent to the restaurant. In case the object is a person being located through the position of his or her user terminal, it is also possible that a call is being set up or a message being sent to this user terminal through clicking on the first line. As an example, such communication may be set up from the user terminal 10 to the further terminal 15 in FIG. 1.

The above-described types of user inputs need not necessarily be associated with the described map selection functions. A clicking on the first line may for instance lead to a zooming out or a panning from one geographical area to the other.

With reference now again being made to FIG. 6B, it is possible that there is at least one or a number of subordinate objects associated with the first object O1. A subordinate object may be an object associated with an entity that is subordinate to an entity associated with the first object. The first object may here represent a person. In this case a subordinate object may represent another person who is under the supervision, command or control of the person associated with the first object. The first object may for instance represent a teacher or a care taker, in which case the subordinate objects may represent students or children in a kindergarten group. The first object may also represent a team leader, where the subordinate objects represent the members of the team. Positions of these subordinate objects may be obtained in the same way as has been described above in relation to the first object.

Figure 7:
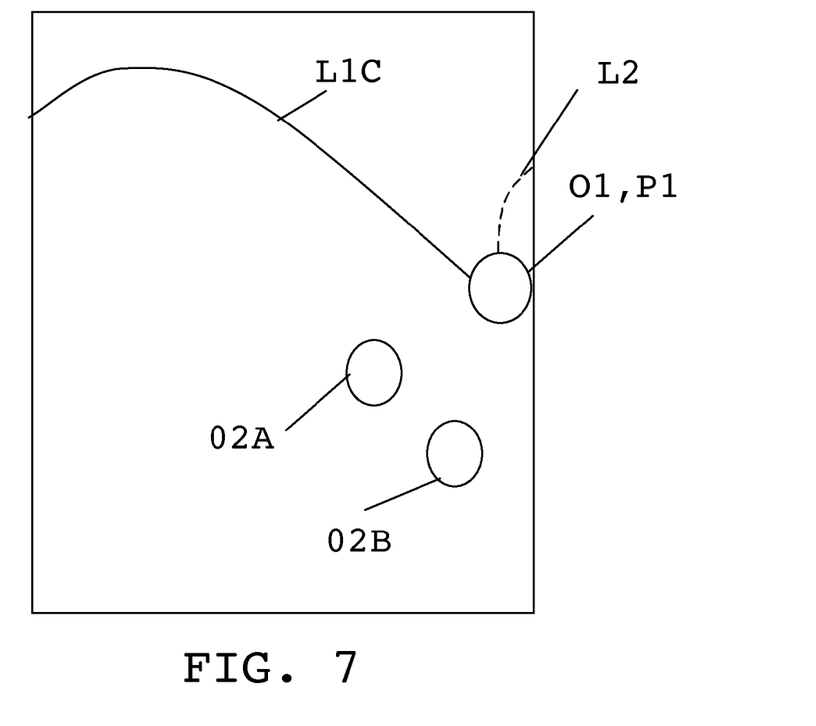

Here it is possible that such further objects are not presented in the second geographical area, but only presented after detecting an instruction to zoom-in in the presented geographical area made by the user. After such an instruction has been detected the server map providing unit 18 can then zoom in in the second geographical area, and provide a geographical area that is more detailed and where further subordinate objects are presented only after performing this zooming-in. An example of this is shown in FIG. 7. Here a part of the first line L1C is presented as before. Subordinate objects O2A and O2B are here also shown. Subordinate objects that are outside of this smaller geographical area may here be indicated through presenting a part of a second line L2, which at one end is connected to the first position P1 and at another opposite end is connected to a second position of a non-disclosed subordinate object. Here it is also possible that the further subordinate objects are not presented or the directions to them presented before the map zoom level is below a zoom threshold. The part of the second line L2 being presented is a part that stretches through the presented geographical area. It is possible that this second line L2 is presented in another format than the first line, for instance in another colour, in order to differentiate it from the first line.

When there are several such subordinate objects it is furthermore possible to provide the first object in a centre point between the positions of these further objects.

The way distance data is coded into the shape of first object may be varied in many ways. The varying of the second line component of the first line exemplified above is therefore just one way in which the shape of the line may be varied. It is possible with other ways in which the second line component may be varied.

Figure 8:
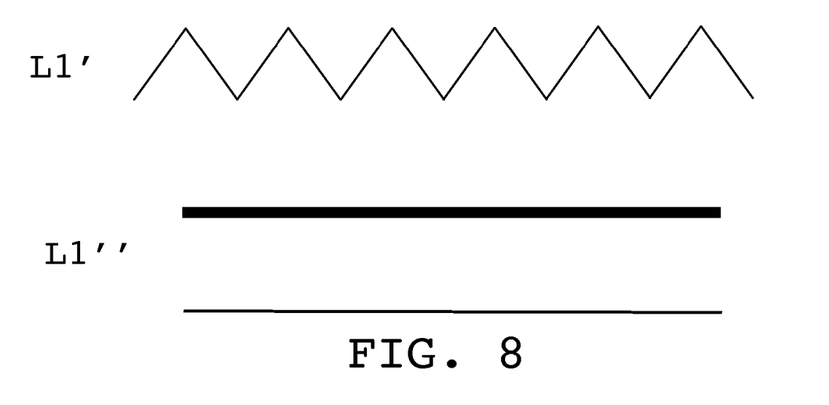
FIG. 8 shows a few alternative configurations of the first line.

Examples of this are shown in FIG. 8. The coding could for instance be provided through the first line L1' being meandering with a spatial meander frequency indicative of the distance. Here it is as an example showing a saw-tooth structure. Other structures are however also feasible such as sinus-shaped. The spatial meander frequency, i.e. the frequency at which the exemplifying saw-teeth appear, may here be inversely proportional to the distance. The higher the spatial frequency is the closer the first object then is to the reference position. The coding could also be provided through varying the thickness of the first line L1". Here the distance may be inversely proportional to the thickness of the first line. A thin line would then represent a longer distance, while a thick line would represent a shorter distance.

It should be realized that the line may be coded in other ways, for instance through dashed and dotted lines, where the spacing between dashes or dots could indicate the distance. It is furthermore also possible with colour or intensity coding of the first line. This may be done through displaying the first line with a colour and/or with an intensity that represents the distance.

In the embodiments described above a server provided the map presenting control functionality. It should be realized that as an alternative the map presenting control functionality could be provided in the user terminal instead. In this case the terminal map providing unit would function as a map presenting control unit, where the functionality of the server object position locating unit would be performed by the terminal object position locating unit. The digital map may then furthermore be stored in the memory 30. It is here also possible that the user terminal fetches the digital map from the map server 14 via the network N. In this variation of the invention, the map providing functionality of the present invention is thus provided through a local application or a part of a local application in the user terminal.

The map providing device may thus be a user terminal like a cellular phone. As such it may be mobile. In this case the reference position may be moving.

Figure 9:
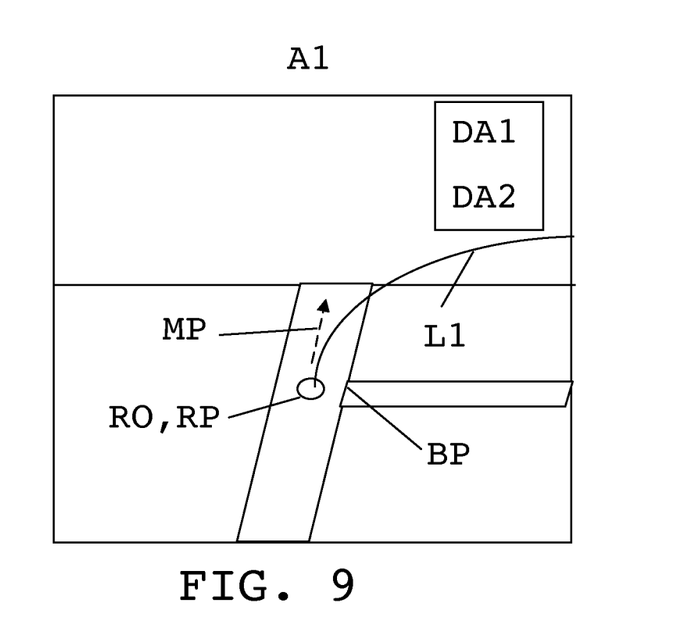
FIG. 9 shows a geographical area being presented when the reference object is moving along a movement path, and FIG. 10 schematically shows a computer program product according to an embodiment of the invention in the form of a CD ROM disc on which a computer program realizing the map providing functionality of the invention is stored.

The map providing device may also be provided in a navigation device, such as a GPS navigation device. The view of such a map providing device is schematically shown in FIG. 9. There is here reference object RO at a reference position RP that moves along a movement path MP in a geographical area A1 of a map. Along this path there is furthermore a branching point BP indicating an alternative route that the reference position RP could be travelling along and that leads to the first object. The presented geographical area here changes as the reference object RO is moved. Here there is a (first part of a) first line L1 indicating the direction and distance to the first object outside of the geographical area A1. There is here also further data DA1 and DA1 relating to the first object and being presented together with the first line L1. The first object could here be a restaurant, in which case the further data may display the menu, price listing and restaurant type. It may also indicate ways of contacting the restaurant. It may here also be possible to contact the restaurant in one of the above described ways for instance through clicking on the first line. The first object could also be a gas station, in which case the data may be data such as types of fuels provided. According to this variation of the invention it is possible that the first line L1 is removed or refrained from being presented in case the branching point BP has been passed. In the example of FIG. 9, this means that as soon as the reference object RO and the reference position RP passes the branching point BP of the movement path MP, then the first line L1 is removed.

This allows the user to get information about objects of interest to him or her as long as they are still relevant.

Figure 10:
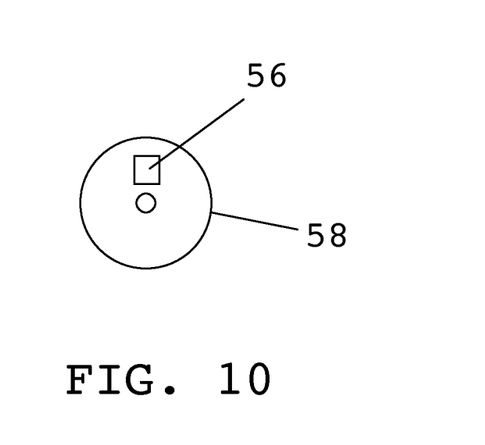

The map providing units and the position locating units may with advantage be provided in the form of a processor with associated program memory including computer program code for performing the functionality of a map presenting control unit. It should be realized that this unit may also be provided in the form of hardware, like for instance in the form of an ASIC circuit. The invention may also be provided as software. This means that the invention may be provided as computer program code which when run on a map providing device for presenting a digital map via a map presenting unit of a user terminal, causes the map providing device to perform the functionality of a map presenting control unit. This program code could furthermore be provided on a data carrier, like a CD ROM disc or a memory stick, which will implement the function of a map presenting control unit when being loaded into a server or user terminal. One such computer program product in the form of a CD ROM disc 58 on which such computer program code 56 is stored is schematically shown in FIG. 10.

While the invention has been described in connection with what is presently considered to be most practical and preferred embodiments, it is to be understood that the invention is not to be limited to the disclosed embodiments, but on the contrary, is intended to cover various modifications and equivalent arrangements. Therefore the invention is only to be limited by the following claims.

The invention claimed is:

1. A method for presenting a digital map via a map presenting unit of a user terminal comprising:
    obtaining a first object and a first position of this first object;
    obtaining a digital map, said digital map comprising a reference position and the first position;
    determining a first line, which at one end is connected to the reference position and at another opposite end to said first position; and
    outputting a geographical area of the digital map including the reference position to the display device associated with the user terminal, wherein outputting the geographical area of the digital map comprises:
        outputting a part of the first line that stretches through the geographical area to the display device when said first position is outside of the geographical area, and not outputting the first line to the display device when said first position is not outside of the geographical area, wherein the first line is at one end connected to the reference position and at another opposite end to said first position; and
        wherein an appearance of the first line, when output to the display device, visually indicates, and is dependent on, a distance between the reference position and the first position;
    providing, in the geographical area on the display device, a user input area extending between the reference position and the first position, and encircling said first line; and
    detecting a user input in the user input area and executing a map selecting function responsive to the detected user input.

2. The method of claim 1 wherein the first line has a first line component extending in a direction from the reference position towards the first position, and a second line component perpendicular to the first line component, and wherein the appearance of the first line is dependent on the distance between the reference position and the first position, and on distance data reflecting the distance that is coded into the second line component.

3. The method of claim 2 wherein the first line is curved, and wherein the distance is coded into the second line component as a largest height between the curved first line and a straight reference line that extends between the reference and first positions, and wherein the largest height is disposed halfway between the reference position and the first position.

4. The method of claim 3 wherein said largest height is pre-determined and independent of the distance between the reference position and the first position relative to the scale of the digital map.

5. The method according to claim 2 wherein the first line comprises a meandering line having a spatial meander frequency indicative of the distance, and wherein the coding in the second line component comprises the spatial meander frequency.

6. The method of claim 5 wherein the spatial meander frequency is inversely proportional to the distance.

7. The method of claim 2 wherein the coding in the second line component comprises a varying thickness of the first line.

8. The method of claim 7 wherein the distance is inversely proportional to the thickness of the first line.

9. The method of claim 1 wherein the appearance of the first line is dependent on the distance between the reference position and the first position that is indicated using a line type, a colour, or a variation in an intensity of the first line.

10. The method of claim 1 wherein one map selecting function changes the geographical area being presented.

11. The method of claim 10 wherein one map selecting function comprises a zoom-out function to present both the reference position and the first position.

12. The method of claim 10 wherein one map selecting function comprises a panning function that pans the digital map to present a geographical area covering the first position, and to present the first object in this geographical area.

13. The method of claim 12 wherein a second object is associated with and subordinate to said first object, and wherein the method further comprises:
providing a second line, which at one end is connected to the first position and at another opposite end to a second position that is a position of said second object;
outputting, to the display device, a part of the second line that extends through the geographical area if said second position is outside the geographical area while the map zoom level is below a zoom threshold; and
not outputting the second line to the display device if said second position is not outside the geographical area while the map zoom level is below the zoom threshold.

14. The method of claim 13 wherein a plurality of additional objects are associated with and subordinate to said first object, and wherein the first position of said first object is a centre point between the positions of these plurality of additional objects.

15. The method of claim 13 further comprising:
detecting an instruction to zoom-in on the presented geographical area;
zooming in on the geographical area; and
presenting additional objects only after zooming-in.

16. The method of claim 1 wherein one map selecting function presents additional data relative to the first object.

17. The method of claim 1 wherein one map selecting function initiates communication with a device associated with the first object.

18. The method of claim 1 wherein one type of user input indicates a direction of movement across the first line and the user input area.

19. The method of claim 1 wherein one type of user input indicates a direction of movement in the user input area along the first line.

20. The method of claim 1 wherein one type of user input comprises a click on the first line.

21. The method of claim 1 wherein the reference position comprises the position of the map presenting unit.

22. The method of claim 21 wherein the reference position moves along a movement path, and wherein the method further comprises removing the first line, or refraining from presenting the first line, if a branching point along the movement path that leads to the first object has been passed by the reference position.

23. The method of claim 1 further comprising presenting data associated with the first object together with the first line.

24. The method of claim 1 wherein the first position is a position associated with a second terminal, and wherein obtaining the position of the second terminal is performed using a position locating function.

25. A map providing device for presenting a digital map via a map presenting unit of a user terminal, the map providing device comprising:
a communication interface configured to communicate data with one or more remote computing devices via a computer network; and
a processing circuit operatively connected to the communication interface and configured to:
obtain a first object and a first position of this first object;
obtain the digital map, said digital map comprising a reference position and the first position;
determine a first line, which at one end is connected to the reference position and at another opposite end to said first position; and
output a geographical area of the digital map comprising said reference position, wherein to output a geographical area of the digital map, the processing circuit:
outputs, to the display device, a part of the first line that extends through the geographical area when said first position is outside of the geographical area, and does not output the first line to the display device when said first position is not outside of the geographical area; and
wherein an appearance of the first line, when output to the display device, visually indicates and is dependent on a distance between the reference position and the first position;
provide, in the geographical area on the display device, a user input area extending between the reference position and the first position, and encircling said first line; and
execute a map selecting function based on a user input detected in said user input area.

26. The map providing device of claim 25 wherein the first position is a position associated with a second terminal, and wherein the processing circuit is further configured to obtain the position of the second terminal.

27. The map providing device of claim 25 wherein the communication interface comprises a network communication interface configured to communicate with other computing devices.

28. The map providing device of claim 27 wherein the map providing device comprises a map server configured to communicate with the user terminal via the network communication interface.

29. The map providing device of claim 25 wherein the map providing device comprises said user terminal, and further comprising a user input unit circuit configured to detect user inputs, and wherein the processing circuit is further configured to output said digital map to the display device.

30. The map providing device of claim 29 wherein the map providing device comprises a cellular phone.

31. The map providing device of claim 30 wherein the map providing device comprises a navigation device.

32. A computer program product comprising a non-transitory computer readable medium configured to store a computer program code thereon, which when executed by a processing circuit at a map providing device configured to present a digital map via a map presenting unit of a user terminal, causes said map providing device to:
- obtain a first object and a first position of the first object;
- obtain the digital map, said digital map comprising a reference position and the first position;
- determine a first line, which at one end is connected to the reference position and at another opposite end to said first position;
- output a geographical area of the digital map including the reference position to the display device associated with the user terminal, wherein to output the geographical area of the digital map, the computer program code, when executed by the processing circuit, causes the map providing device to:
- output, to the display device, a part of the first line that extends through the geographical area if said first position is outside of the geographical area, and not output the first line to the display device if said first position is not outside of the geographical area; and
- wherein an appearance of the first line, when presented, is dependent on the distance between the reference position and the first position;
- provide, in the geographical area on the display device, a user input area extending between the reference position and the first position, and encircling said first line; and
- execute a map selecting function based on a user input detected in said user input area.

\* \* \* \* \*